Sept. 17, 1946.                    G. GAILUS                    2,407,740
                                     HOE
                              Filed Nov. 9, 1944
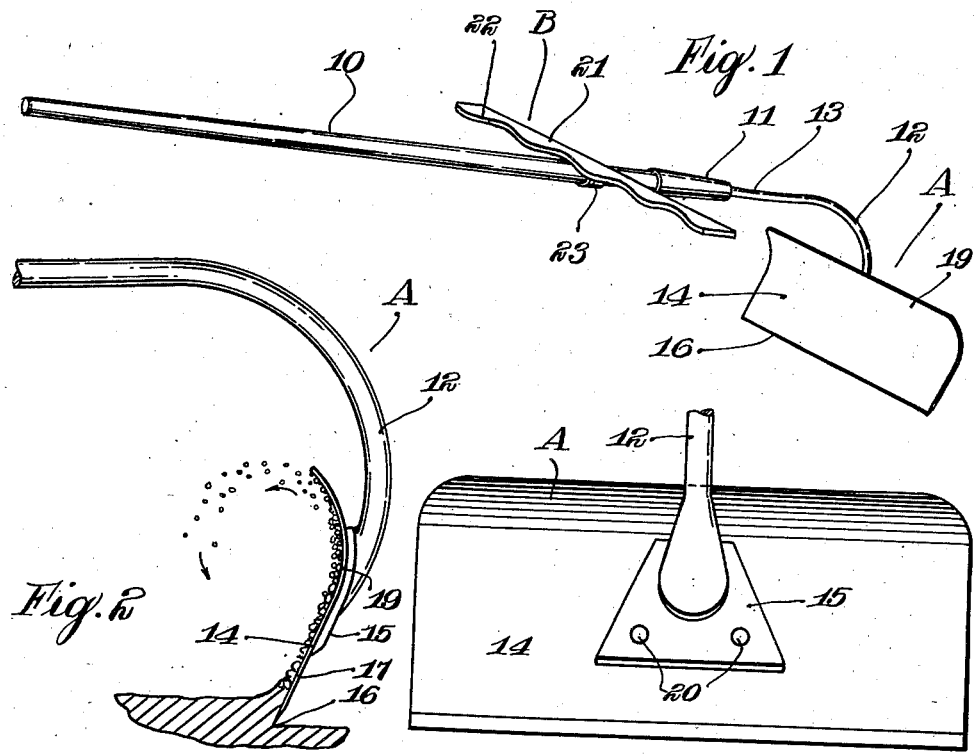
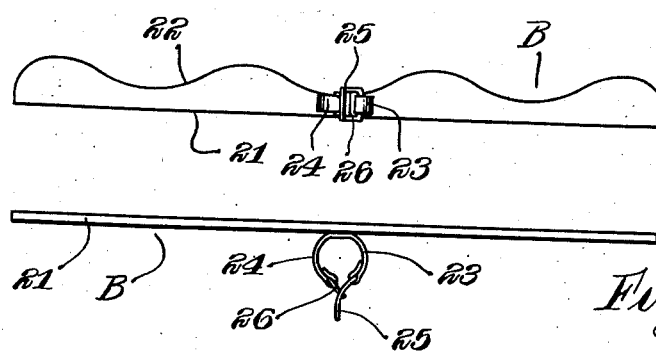
Inventor
George Gailus
By Robert M. Dunning
Attorney Patented Sept. 17, 1946

2,407,740

UNITED STATES PATENT OFFICE 2,407,740

HOE

George Gailus, Stillwater, Minn.

Application November 9, 1944, Serial No. 562,616

2 Claims. (Cl. 97—65)

My invention relates to an improvement in hoes wherein it is desired to provide a novel and effective hoe for cultivating purposes.

Hoes are ordinarily made with substantially flat blades and are operated by a chopping motion. I have found that it is much easier to break up the soil and to destroy weeds and the like by drawing the hoe along the surface of the ground. A flat hoe blade will not act properly to turn over the ground as the blade is scraped along the same. I have found, however, that if the blade is provided with a short flat blade at the lowermost extremity and is provided with a curved upper portion the earth and weeds will be acted upon in a manner to turn the earth and weeds upside down. As a result the weeds not only are cut off, but the roots thereof are left exposed, or else the entire weed is buried beneath the ground.

It is the object of the present invention to provide a hoe having a blade of a specific type which will act to roll the earth and weeds as the blade is drawn along the ground. In order to accomplish this result I have found it desirable to form the blade with a flat lowermost area, preferably sharpened to provide a relatively sharp edge, and a forwardly curved upper portion which guides earth and weeds moved thereby in a manner to invert the same.

It is a further object of my invention to provide a hoe particularly useful in the killing of plants or the like. The blade of my hoe is so shaped as to throw loosened dirt forwardly in the direction of movement of the blade so that the loose earth may be collected in front of the hoe blade and drawn into a pile. Due to the fact that the shape of the blade tends to roll the loose earth forwardly, the work necessary to build up a hill about a plant or series of plants is greatly facilitated.

A feature of the present invention lies in the means of attachment of the handle to the hoe blade. In order that the entire forward area of the blade be free to accomplish its desired purpose and in order to prevent weeds and the like from catching between the blade and the handle shank, I provide a reinforcing plate on the rear surface of the blade spaced from any edge thereof and extend a long rounded shank from this reinforcing plate upwardly and curved forwardly into engagement with the hoe handle.

A further feature of the prevent invention lies in providing a hoe which may be used about the plants which are being hilled. The shank connecting the hoe blade to the handle is elevated substantially above the level of the hoe, making it possible to work about the plants without danger of hitting the plants and bending or breaking the same with the handle of the hoe.

A further feature of the prevent invention resides in the provision of a removable transverse bar which clamps about the handle of the hoe and which acts to bend high weeds downwardly in advance of the hoe blade. While the weeds are bent forwardly by this cross member earth is rolled upon the roots of the weeds, bending them to a greater extent prior to the actual cutting off of the weeds below the surface of the earth.

These and other objects and novel features of my invention will be more clearly and fully set forth in the following specification and claims.

In the drawing forming a part of my specification:

Figure 1 is a perspective view of a hoe showing my new construction.

Figure 2 is a side elevational view of the hoe blade showing the manner in which the same operates.

Figure 3 is a rear elevational view of the hoe blade.

Figure 4 is a bottom plan view of the transverse brace which is removably clamped to the handle of the hoe.

Figure 5 is an elevational view showing the cross member illustrated in Figure 4.

The hoe A comprises a handle 10 of usual type preferably having a reinforcing ferrule or the like 11 at the end thereof. A curved shank 12 is provided with a relatively straight portion 13 which continues into a goose neck connection with the blade 14 of the hoe. As best illustrated in Figures 2 and 3 of the drawing the shank 12 is formed to provide a reinforcing plate 15 overlying the rear surface of the hoe blade.

The blade 14 is substantially flat at its lower extremity being provided with a sharpened lower edge 16 and an inclined substantially flat blade portion 17 extending upwardly therefrom. This inclined flat portion merges into a forwardly curved portion 19. The curve of the blade increases with the distance from the lower edge 16 of the blade as best indicated in Figures 1 and 2 of the drawing.

The reinforcing plate 15 is held to the rear surface of the blade by rivets 20 or other suitable means and this plate is preferably spaced from all of the edges of the blade. The shank 12 extends rearwardly from the reinforcing plate 15 in spaced relation to the upper edge of the blade and the curve of the shank spaces the shank substantially from the upper portion of the blade. The shank is substantially above the level of the top of the blade so that the hoe may be used for hilling and cultivating about plants without danger of breaking the plants by contact with the handle of the hoe.

Clamped to the handle 10 I provide a transverse bar or cross member illustrated in general by the letter B. The bar or cross member B is preferably provided with a straight rear edge 21 and a notched or scalloped forward edge 22. The edge 22 provides grooves in the forward edge which tend to prevent the weeds from sliding laterally along the cross member. In other words, the weeds engaged by the cross member are held from slipping off the ends of this member by the notches or the indentations between spaced scallops.

Secured to the under surface of the cross member B, I provide a clamp 23 designed to engage about the handle of the hoe. The clamp 23 includes a handle encircling strip 24, each end of which is pivotally attached to a clamping link. One end of the strip 24 is connected with the elongated clamping lever 25, while the other end of the strip 24 is pivotally connected to a link 26 which connects the band with a mid-point on the lever 25. By pivoting the lever 25 in a counter-clockwise direction from the position shown in Figure 5 of the drawing, the band 24 may be tightly clamped about the handle 10 of the hoe.

In operation the cross member B tends to bend down tall weeds forwardly of the hoe blade so as to provide a clearer vision of the hoe blade and also to bend the weeds forwardly. As the hoe blade is drawn toward the bent weeds, earth being rolled forwardly by the blade strikes the weeds, tending to further bend the same downwardly. This action not only provides a clearer vision so that the operator of the hoe may better see the results being accomplished, but also the bending of the weeds seems to facilitate the cutting down of the same with the hoe.

As the blade of the hoe scrapes along the ground the earth slides upwardly and rearwardly on the blade, being turned over by the top of the blade in a rolling action. This action seems to invert the weeds being cut as well as the ground scraped by the blade.

In accordance with the patent statutes, I have described the principles of construction and operation of my hoe, and while I have endeavored to set forth the best embodiment thereof, I desire to have it understood that obvious changes may be made within the scope of the following claims without departing from the spirit of my invention.

I claim:

1. A hoe comprising a blade having a substantially flat lower portion and a forwardly curved integral upper portion, a handle secured to the rear convex surface of the blade and extending forwardly over the upper edge of the blade, said handle extending forwardly and upwardly at a slant when the flat lower portion of said blade is inclined upwardly and rearwardly, a bar secured to said handle at a point spaced forwardly from said blade, said bar extending transversely from said handle and being secured intermediate its ends thereto, said bar being substantially parallel to the lower edge of said flat blade portion, said bar acting to bend weeds and the like forwardly to hold the same at a forwardly inclined angle as they are cut off by the lower edge of said blade.

2. A hoe comprising a blade having a substantially flat lower portion and a forwardly curved integral upper portion, a handle secured to the rear convex surface of the blade and extending forwardly over the upper edge of the blade, said handle extending forwardly and upwardly at a slant when the flat lower portion of said blade is inclined upwardly and rearwardly, a bar secured to said handle at a point spaced forwardly from said blade, said bar extending transversely from said handle and being secured intermediate its ends thereto, said bar being substantially parallel to the lower edge of said flat blade portion, said bar acting to bend weeds and the like forwardly to hold the same at a forwardly inclined angle as they are cut off by the lower edge of said blade, said bar having a notched forward edge to prevent lateral movement of material engaging the same.

GEORGE GAILUS.